United States Patent
Schade et al.

[11] 3,718,796
[45] Feb. 27, 1973

[54] METHOD OF MANUFACTURING WAVED AND CONED FRICTION MATERIAL FACED FRICTION PLATES

[75] Inventors: Charles Schade, Speedway; Jack F. Staley, Alexandria, both of Ind.

[73] Assignee: General Motors Corporation, Detroit, Mich.

[22] Filed: March 3, 1972

[21] Appl. No.: 231,526

[52] U.S. Cl. ............. 219/10.41, 219/7.5, 219/10.57
[51] Int. Cl. ................................................. H05b 5/00
[58] Field of Search .......... 219/9.5, 7.5, 10.41, 10.43, 219/10.57, 10.67, 10.73, 10.79, 148, 149–154; 72/342

[56] References Cited

UNITED STATES PATENTS

| | | | |
|---|---|---|---|
| 3,258,573 | 6/1966 | Morin et al. | 219/9.5 |
| 3,251,974 | 5/1966 | Seyfried | 219/7.5 |
| 2,733,797 | 2/1956 | Almen et al. | 192/107 |

OTHER PUBLICATIONS

Cotterell and Parkes, "Thermal Buckling of Circular Plates", (British) Ministry of Aviation Aeronautical Research Council, 1962, R&M No. 3245, London: Her Majesty's Stationery Office.

Primary Examiner—C. L. Albritton
Assistant Examiner—B. A. Reynolds
Attorney—W. E. Finken et al.

[57] ABSTRACT

The waved or coned organic friction material faced steel plates are manufactured by stamping sheet steel to provide flat annular steel plates with spline teeth thereon. Then, while flat, organic annular friction material facings are adhesively bonded to the steel plates. The flat faced plate is clamped in a dielectric material stress intensifying fixture placed in a high frequency concentrating induction heating coil with an annular intensifier plate aligned with the outer edge of the steel friction plate to concentrate the heat at the outer edge of the annular friction plate. The coil is briefly energized by an induction heater generator to provide concentrated heating at the adjacent edge of the friction plate to induce a high radial temperature gradient in the steel plate without excessively heating the facing or the adhesive bond to cause impairment. If the intensifier fixture contacts and restrains both sides of the friction plate uniformly about the inner portion of its perimeter, a coned plate is formed. If the intensifier clamping fixture engages one plate in face relation and the other at peripherally spaced portions, a waved plate is formed.

6 Claims, 6 Drawing Figures

PATENTED FEB 27 1973

3,718,796

METHOD OF MANUFACTURING WAVED AND CONED FRICTION MATERIAL FACED FRICTION PLATES

This invention relates to a method of manufacturing contorted friction faced steel plates and particularly contorting organic friction material faced steel friction plates.

While friction material plates having a contorted form, such as waved or coned, have been used, these plates are known to be made by first waving or coning the steel base plate and thereafter adhering friction material to the contorted steel plate. It has also been recognized that steel plates may be contorted into waved and coned shapes by edge heating.

We propose a method of manufacture of contorted, i.e., waved or coned, friction material faced steel plates for use as friction plates in clutches and brakes. The steel plates are first stamped from flat sheet steel to the desired form generally annular with spline teeth on the inner or outer perimeter. Then a friction material facing is adhesively bonded to one or both sides of the steel plate. Typical friction material facings are made of fibrous felted sheet or fibrous filler materials adhesively bonded together by thermosetting resin materials, such as phenolic or epoxy resins. Such friction material is adhered to the steel plate by bonding with such resins. Then the steel plates are heated at the perimeter momentarily by a concentrating induction heater at one perimeter to induce a high temperature radial gradient while the plate is in a dielectric material restraining device or stress intensifier fixture which holds the friction face ring with sufficient force so that the deformation induced by the radial temperature gradient causes a stress in the steel plate beyond the elastic limit to cause permanent buckling into the desired contorted form, such as a cone or a wave. The heat is concentrated at a perimeter of the steel plate so typical commercial organic friction material facings and bonding materials are not overheated to cause deterioration or premature failure in use.

An object of the invention is to form a contorted organic friction material faced metal plate assembly by camping the faced plate in a dielectric material restraining fixture restraining a portion of the faced plate and the remaining portion being unrestrained subjecting the flat faced plate to localized heating which provides a radial temperature gradient inducing internal stress in the steel plate to exceed the modulus of elasticity of the steel plate due to the restraint to cause permanent buckling of the unrestrained portion of the plate to the shape determined by the restraining device without deterioration of the organic friction material facing.

Another object of the invention is to form a flat annular organic friction material faced steel friction plate into a coned plate by placing the faced plate in a dielectric material restraining fixture to hold the inner peripheral edge against movement and employing an induction heater coil to heat the outer peripheral edge of the steel plate for a short period of time to cause a radial temperature gradient and deflection beyond the elastic limit to deform the flat steel plate to a coned plate.

Another object of the invention is to form a flat annular organic friction material faced steel friction plate into a waved plate by placing the faced plate in a dielectric material restraining fixture to hold spaced radial portions against movement and employing an induction heater coil to heat the outer peripheral edge to cause a radial temperature gradient and deflection beyond the elastic limit to deform the flat steel plate to a waved plate.

These and other objects of the invention will be more apparent from the following description and drawing in which.

Figure 1:
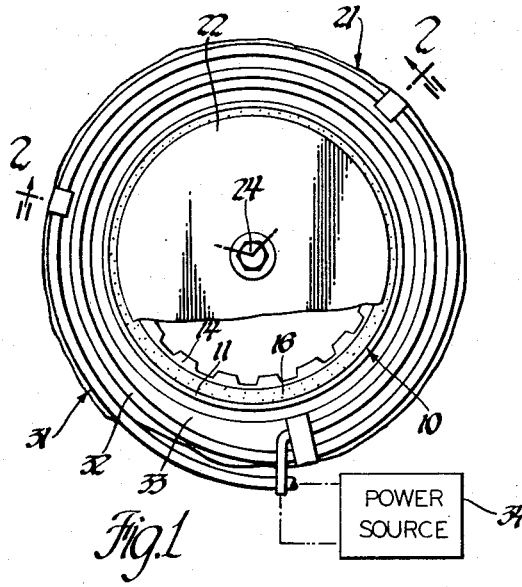
FIG. 1 shows a faced steel plate in a restraining fixture and an induction heating coil arranged to deform the plate into a conical shape.

In this method of manufacturing a contorted faced friction material plate 10, the steel backing members are stamped and faced with friction material while flat. The plate 10 has an annular steel backing member 11 having an outer perimeter 12 and an inner perimeter 13 having splines 14. Annular friction material facing members 16 are adhered to one or preferably both sides of the flat steel plate 11. Preferably an organic friction material, organic and/or inorganic fibers bonded together by an organic thermal setting cement or resin, such as a phenolic or epoxy resin, is used. A thermal setting adhesive bonding material, such as a phenolic or epoxy resin adhesively bonds the friction material to the steel plate. Examples of suitable faced friction material plates are disclosed in the John. O. Almen et al U.S. Pat. Nos. 2,733,797 and 2,733,798 both granted Feb. 7, 1956.

In accordance with this method of forming a contorted faced friction plate, the steel plate 11 is stamped from flat sheet steel to form the annular plate 11 with the outer perimeter 12 smooth and the inner edge 13 having splines 14. Then, while the steel plate 11 is flat, the annular friction material members 16 are bonded to the annular surfaces of the steel plate 11 to form a flat annular friction material faced friction plate. Thus the simple methods of manufacturing flat friction material faced steel plates are used.

The flat faced friction plate 10 is then placed in a restraining fixture 21 having a top plate 22 and a bottom plate 23 both made of dielectric material and a clamping device 24 such as a bolt to secure the outer peripheral edges 26 and 27 of the dielectric material clamping plates 22 and 23 respectively in clamping engagement with the radially inner half portion of the faced friction plate 10. The peripheral edges 26 and 27 of the clamping plates are slightly rounded, or sufficiently rounded, so that a sharp edge does not engage the friction material and cut or groove the friction material facing during the contorting step.

Induction heating coil 31, having several coils of copper tubing conductor 32, preferably four coils in an annular arrangement as shown, is secured to a copper concentrating plate 33. The clamping fixture with the faced friction plate clamped therein is then placed concentrically within the heating coil 31 with the plate in, or near, the same plane as the annular concentrator plate 33. Cooling fluid such as water is supplied to the copper tubing conductor 32 for cooling. Then a suitable induction heating power source is connected to the induction heating coil and briefly energized to heat the outer peripheral portion adjacent the outer periphery 12 to create a temperature gradient between the high temperature outer perimeter 12 and the low temperature inner perimeter 13 sufficiently great to cause distortion which, because of the restraint by the restraining fixture 21, produces a stress in the steel plate 11 in excess of its elastic limit and will cause permanent coning of the faced friction plate 10.

In applying this method of coning to a faced friction plate 10 including a steel backing plate 11 having an outer diameter of 8.375 inches and a thickness of 0.050 inches and facing materials about 0.015 inches thick with the concentrator ring spaced 0.125 inches from the external perimeter. A commercially available induction heating power source having a 45 kva input, 20 kw output, 180 to 300 kilocycles high frequency heating power supply was used. This induction heater was induction, or power factor, balanced or matched for the particular coil, work piece and distance therebetween in accordance with normal practice. The saturable reactor power control was set at approximately 60 percent for this arrangement providing about 17 to 18 kw output power with a frequency in the 180 to 300 kilocycles range. This power was supplied for a measured time period of about 8 seconds. The concentrator ring must be concentric with the steel plate and preferably in the same plane, but a small offset above or below the plane of the steel plate does also permit proper heating.

This application of induction heating provided a temperature gradient of 400° to 500°F between the outer perimeter 12 and the inner perimeter 13 in the faced friction plate which caused the expansion of the outer portion of the steel plate 11 creating thermally induced stress in the steel plate beyond the elastic limit to provide permanent deformation in the form of a coned plate. A temperature gradient of about 100°F per 0.010 inch of radius has been found adequate. A high temperature of 700° to 800°F at the outer perimeter at the terminal portion of the heating period of about 8 seconds has been found not to impair or deteriorate commercial organic friction material of the type disclosed in the above Almen patents.

Figure 4:
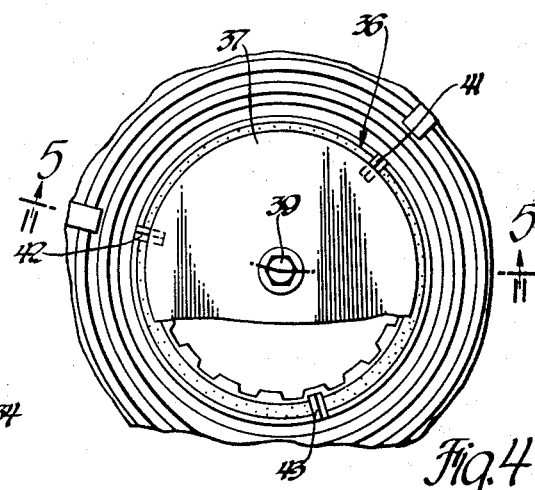
FIG. 4 is a view of a faced friction plate in a restraining fixture engaging spaced peripheral portions within an induction heater coil for providing a waved plate.
Figure 2:
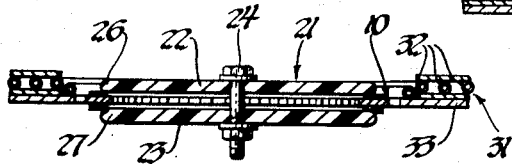
FIG. 2 is a section of FIG. 1 on the line 2—2.
Figure 5:
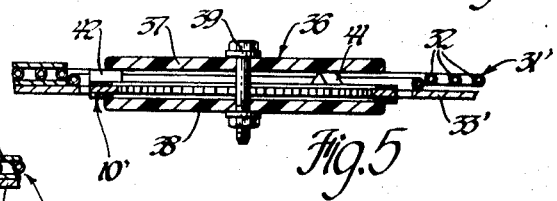
FIG. 5 is a section of FIG. 4 on the line 5—5.
Figure 3:
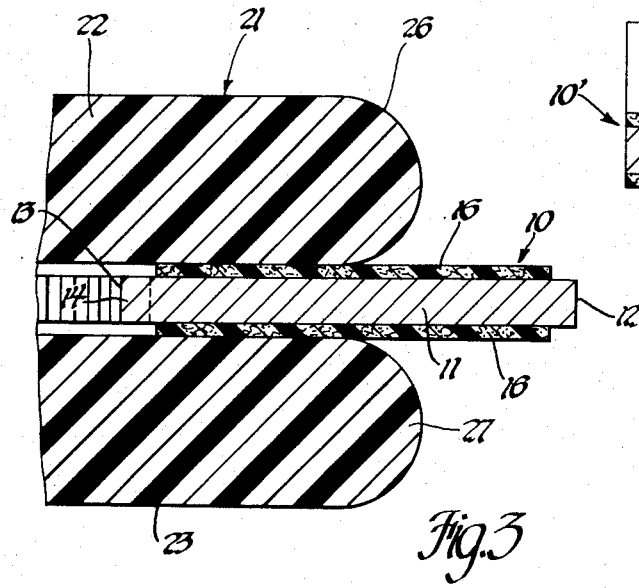
FIG. 3 is a partial enlargement of FIG. 2 on the line 2—2.
Figure 6:
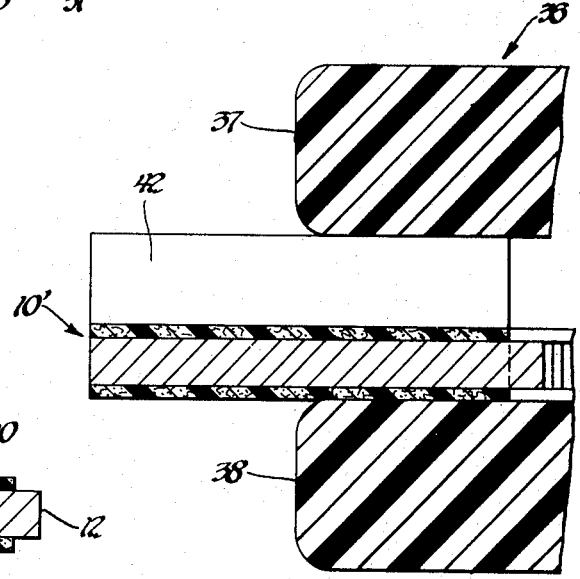
FIG. 6 is a partial enlargement of FIG. 4 on the line 5—5.

As illustrated in FIGS. 4 to 6, a similar arrangement may be employed to provide a waved clutch plate. As shown in FIG. 6, the plate 10' has the same structure as the plate 10 but instead of being coned, it will be waved. The flat faced plate 10' placed in a restraining fixture 36 which has an upper dielectric disc member 37 and a lower dielectric disc member 38 secured together by a clamping device 39 which may conveniently be a bolt. If three equally spaced waves are desired, three equally spaced spacer blocks 41, 42 and 43 are placed on one side of the friction plate 10' between the friction plate and the plate 37 as shown in FIGS. 4 and 5. The spacer blocks extend radially for the radial width of the facing and steel backing member 11 and have sufficient width to provide an area so the facing material is not crushed. The friction faced plate in this restraining fixture 36 is then positioned within the induction heating coil 31' which is the same as the induction heating coil 31. When the above power supply 34 is employed in the same manner to energize the induction heating coil 31', for the same time, on the same plate as used above, a radial temperature gradient of 400° to 500°F provides thermal expansion at the outer peripheral region resulting in compression at the other diameter creating a thermal stress beyond the elastic limit of the steel backing member 11 which is relieved by waving the plate in three equally spaced waves.

The induction heating coil 31, having annular coils and an annular concentrator plate to concentrate the induction heating at the inner diameter, is located sufficiently close to the outer perimeter of the steel plate so that the high frequency induction heating is concentrated at the outer perimeter of the steel plate. This induction heating is continued for a very short time, just sufficient to provide a large temperature gradient between the hotter outer and cooler inner periphery on the order of 400° to 500°F. This provides about 100°F per 0.010 inch of radius temperature gradient. Since the plates in the above examples have a 0.75 to 0.875 inch radial width it appears they are heated in a small outer peripheral zone and that the high reducing temperature gradient zone is in this outer zone and a central zone just within this outer zone and that there is a lower reducing temperature gradient zone near the inner perimeter. The friction material, a dielectric material is not directly heated. The steel is directly heated at the outer perimeter but the temperature and short time at maximum temperature are such that the friction material and the adhesive bond between the friction material and the steel is not impaired or deteriorated by heat. Since induction heating selectively heats the steel backing plate 11 and does not cause induction heating in the phenolic and fibrous friction material 16 or the dielectric material restraining fixture this high temperature gradient can be obtained in a steel without excessive heating or charring of the friction material during the short heating period.

This method may be modified within the scope of the claims.

It is claimed:

1. In a method of manufacturing a contorted friction material faced friction plate; the step of placing an annular flat friction plate having a flat annular steel backing member plate and an annular flat friction material facing adhesively bonded to the steel plate in a dielectric material restraining fixture and securing the fixture to restrain deformation movement of a portion of the steel plate in the contorted shape; and the step of induction heating one peripheral portion of the steel plate to provide in the steel plate a high radial temperature gradient from the one peripheral portion toward the other peripheral portion to cause thermal deformation to the contorted form in which the restraining fixture restrains the steel plate and then causes thermal stress in the restrained steel plate beyond the elastic limit to cause permanent deformation to the contorted form determined by the restraining fixture.

2. The invention defined by claim 1 and said friction material facing being a thermal setting cemented organic fibrous friction material adhesively bonded to the steel plate by a thermal setting resin.

3. In a method of manufacturing a coned friction material faced friction plate; the step of placing an annular flat friction plate having a flat annular steel backing member plate with internal splines and an annular flat friction material facing adhesively bonded to the steel plate in a dielectric material restraining fixture and securing the fixture to restrain deformation movement of the friction plate in a cone form and the step of induction heating the outer peripheral edge to provide in the steel plate a high radical temperature gradient from a high temperature at the outer perimeter of insufficient degree and duration to deteriorate the friction material and adhesive bonding to a low temperature at the inner perimeter to cause thermal deformation to the cone form in which the restraining fixture restrains the steel plate and cause thermally induced stress in the restrained steel plate beyond the elastic limit to cause permanent deformation of the friction plate to a coned form determined by the restraining fixture.

4. The invention defined by claim 3 and said friction material facing being a thermal setting cemented organic fibrous friction material adhesively bonded to the steel plate by a thermal setting resin.

5. In a method of manufacturing a waved friction material faced friction plate; the step of placing an annular flat friction plate having a flat annular steel backing member plate with internal splines and an annular flat friction material facing adhesively bonded to the steel plate in a dielectric material restraining fixture and securing the fixture to restrain deformation movement of the friction plate in a wave form and the step of induction heating the outer peripheral edge to provide in the steel plate a high radial temperature gradient from a high temperature at the outer perimeter of insufficient degree and duration to deteriorate the friction material and adhesive bonding to a low temperature at the inner perimeter to cause thermal deformation to the wave form in which the restraining fixture restrains the steel plate and cause thermally induced stress in the restrained steel plate beyond the elastic limit to cause permanent deformation of the friction plate to a waved form determined by the restraining fixture.

6. The invention defined by claim 5 and said friction material facing being a thermal setting cemented organic fibrous friction material adhesively bonded to the steel plate by a thermal setting resin.

* * * * *

UNITED STATES PATENT OFFICE
CERTIFICATE OF CORRECTION

Patent No. 3,718,796   Dated February 27, 1973

Inventor(s) Charles Schade & Jack F. Staley

It is certified that error appears in the above-identified patent and that said Letters Patent are hereby corrected as shown below:

In the Claims, claim 3, line 12, "radical" should be -- radial --.

Signed and Sealed this thirteenth Day of January 1976

[SEAL]

Attest:

RUTH C. MASON
Attesting Officer

C. MARSHALL DANN
Commissioner of Patents and Trademarks